(12) United States Patent
Feng (10) Patent No.: US 11,872,645 B1
(45) Date of Patent: Jan. 16, 2024

(54) MULTI-FUNCTIONAL SAW (71) Applicant: JINHUA SHENGXIANG TOOLS CO., LTD, Zhejiang (CN)

(72) Inventor: Yisheng Feng, Zhejiang (CN)

(73) Assignee: JINHUA SHENGXIANG TOOLS CO., LTD, Jinhua (CN)

( * ) Notice: Subject to any disclaimer, the term of this patent is extended or adjusted under 35 U.S.C. 154(b) by 0 days.

(21) Appl. No.: 18/211,600

(22) Filed: Jun. 20, 2023

(51) Int. Cl.
*B23D 49/12* (2006.01)
*B25F 1/00* (2006.01)

(52) U.S. Cl.
CPC ............... *B23D 49/12* (2013.01); *B25F 1/00* (2013.01)

(58) Field of Classification Search
CPC .................................. B23D 49/12; B25F 1/00
USPC ...................... 7/149; 30/144, 166.3
See application file for complete search history.

(56) References Cited

U.S. PATENT DOCUMENTS

| | | | | |
|---|---|---|---|---|
| 5,074,002 A * | 12/1991 | Huang | ................... | B23D 51/03 7/149 |
| 8,763,260 B2 * | 7/2014 | Ranieri | .................. | B23D 51/03 30/512 |
| 8,776,385 B2 * | 7/2014 | Huang | ................... | B23D 51/14 30/512 |
| 9,180,535 B2 * | 11/2015 | Vanderbeek | ............. | B25F 1/04 |
| 2002/0131267 A1 * | 9/2002 | Van Osenbruggen | | B23Q 17/2404 362/109 |

* cited by examiner

*Primary Examiner* — Hadi Shakeri (57) ABSTRACT

A multi-functional saw includes a hacksaw assembly and a handsaw assembly. The hacksaw assembly includes a hacksaw handle, a hacksaw blade and a saw bow. The handsaw assembly includes a handsaw handle and a handsaw blade. A connecting portion is provided at a top of the handsaw handle, and the handsaw blade is connected to the connecting portion by a connecting unit. One end of the saw bow is connected to a top of the hacksaw handle, and another end of the saw bow is detachably connected to the connecting portion of the handsaw handle by the connecting unit. The handsaw blade is accommodated in the saw bow when the saw bow connected to the connecting portion. One end of the hacksaw blade is connected to a bottom of the hacksaw handle, and another end of the hacksaw is detachably connected to a bottom of the handsaw handle.

19 Claims, 7 Drawing Sheets

MULTI-FUNCTIONAL SAW

CROSS-REFERENCE TO RELATED APPLICATIONS

The present invention claims priority of Chinese Patent Application No. 202320334308.4, May 4, 2023, the entire contents of which are hereby incorporated by reference.

TECHNICAL FIELD

The present invention relates to the technical field of saws, and in particular to a multi-functional saw.

BACKGROUND

Hacksaws are well-known manual tools for cutting objects, such as metal. An existing hacksaw generally includes a hacksaw frame and a toothed steel blade connected to the hacksaw frame, which is simplex in structure and function, and can not meet the demands of complex applications.

SUMMARY

An object of the present invention is to provide a multi-functional saw that is capable of meeting the demands of complex applications.

In order to achieve the above-mentioned object, an embodiment of the present invention provides a multi-functional saw that includes a hacksaw assembly and a handsaw assembly. The hacksaw assembly includes a hacksaw handle, a hacksaw blade and a saw bow. The handsaw assembly includes a handsaw handle and a handsaw blade. A connecting portion is provided at a top of the handsaw handle, and the handsaw blade is connected to the connecting portion by a connecting unit. One end of the saw bow is connected to a top of the hacksaw handle, and another end of the saw bow is detachably connected to the connecting portion of the handsaw handle by the connecting unit. The handsaw blade is accommodated in the saw bow when the saw bow connected to the connecting portion. One end of the hacksaw blade is connected to a bottom of the hacksaw handle, and another end of the hacksaw is detachably connected to a bottom of the handsaw handle.

Compared with the prior art, the multi-functional saw according to an embodiment of the present invention includes a hacksaw assembly and a handsaw assembly, wherein the hacksaw assembly and the handsaw assembly may be connected to each other to construct a hacksaw, or the handsaw assembly may be alone construct a handsaw after being detached from hacksaw assembly. That is, the present multi-functional saw can be used as two different types of saws, and has an advantage of one object with multifunction. The user can choose a corresponding usage mode according to the object to be cut, thereby meeting the demands of complex applications.

BRIEF DESCRIPTION OF THE DRAWINGS

In order to illustrate the technical solution in embodiments of the present invention more clearly, the following briefly introduces accompanying drawings used in the description of the embodiments. Obviously, the accompanying drawings in the following description are only some embodiments of the present invention. Those of ordinary skill in the art can obtain other accompanying drawings from these accompanying drawings without any creative efforts.

DESCRIPTION OF THE EMBODIMENTS

In order to make those skilled in the art better understand the technical solution of the present invention, the technical solution in the embodiments of the present invention will be clearly and completely described below with reference to accompanying drawings in the embodiments of the present invention. It should be noted that in the absence of conflicts, embodiments of present invention and features in the embodiments can be combined with each other. Based on the embodiments of the present invention, all other embodiments obtained by those skilled in the art without any creative efforts fall within the protection scope of the present invention.

In the specification of the present invention, the oriental or positional relationships indicated by the terms "longitudinal", "transverse", "top", "bottom", "left", "right", "front", "rear", "inner", "outer", "central", "axial", "radial", "circumferential" and the like are only intended to facilitate the description of the present invention and simplify the description based on oriental or positional relationships shown in the accompanying drawings, not to indicate or imply that the apparatus or element referred must have a specific orientation, is constructed and operated in a specific orientation, and therefore cannot be understood as a limitation of the present invention.

It should be noted that when an element is referred to as being "fixed to" or "disposed in/at/on" another element, it may be directly or indirectly to the other element. When an element is referred to as being "connected to" another element, it may be directly or indirectly connected to the other element, or it may be fixedly or detachably connected to the other element, or it may be mechanically or electrically connected to the other element, or it may be communication of interiors of two elements.

In addition, terms "first", "second" and the like are only used for descriptive purposes, and cannot be understood as indicating or implying relative importance or implicitly indicating the number of technical features indicated. Therefore, features defined with "first" and "second"may explicitly or implicitly include one or more of these features. In the description of the present disclosure, "a plurality of" refers to two or more than two, unless otherwise particularly defined.

Unless otherwise specified and limited, the specific meanings of all technical and scientific terms used in the specification can be specifically understood by persons of ordinary skill in the art. The terms used in the specification of the present invention is for the purpose of describing specific embodiments only and is not intended to limit this application.

Figure 1:
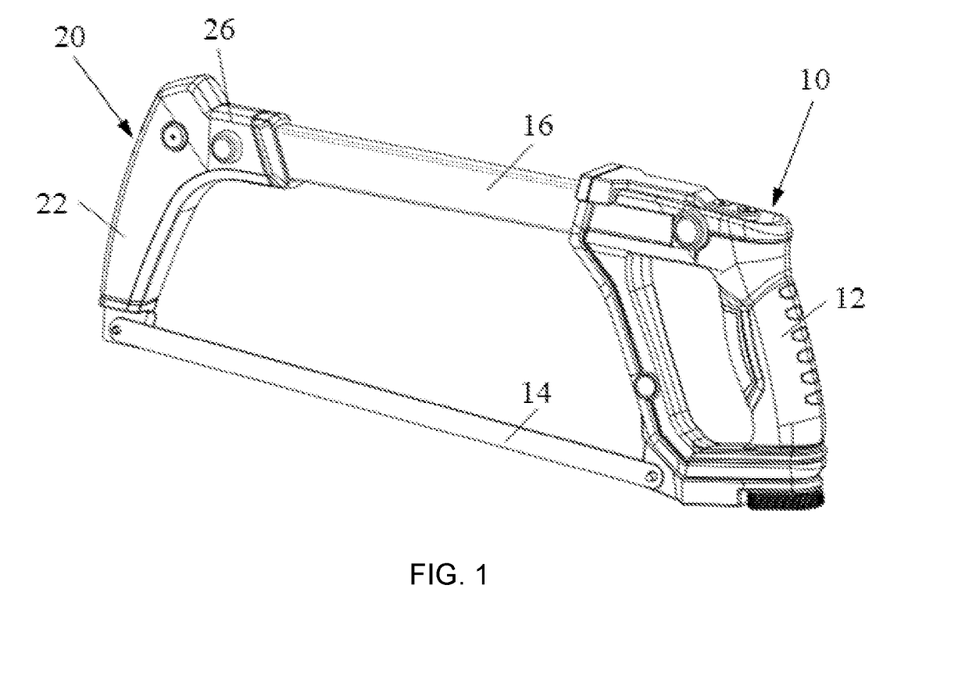
FIG. 1 is an isometric, assembled view of a multi-functional saw according to an embodiment of the present invention.
Figure 2:
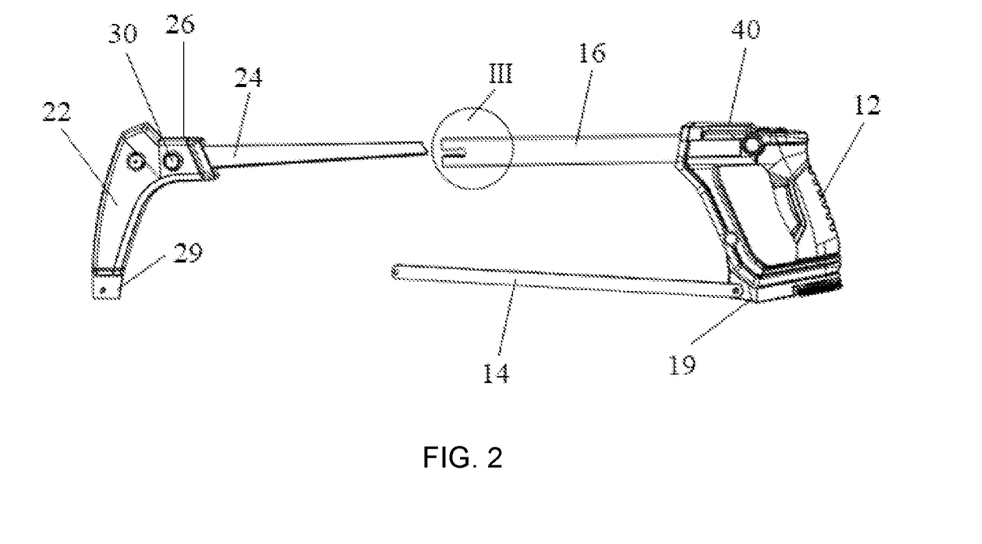
FIG. 2 is an exploded view of the multi-functional saw of FIG. 1.

Referring to FIG. 1 and FIG. 2, a multi-functional saw according to an embodiment of the present invention is shown. In this embodiment, the multi-functional saw includes a hacksaw assembly 10 and a handsaw assembly 20 that are detachably connected to each other.

The hacksaw assembly 10 includes a hacksaw handle 12, a hacksaw blade 14 and a saw bow 16. The handsaw assembly 20 includes a handsaw handle 22 and a handsaw blade 24. The handsaw handle 22 and the hacksaw handle 12 are provided at two ends (such as front and rear ends) of the multi-functional saw, respectively, both are configured for users to hold with their hands. In this embodiment, the hacksaw handle 12 is configured as a closed handle structure, and the handsaw handle 22 is configured as a pistol grip saw frame structure.

The hacksaw blade 14 and the handsaw blade 24 are configured for cutting objects, and preferably are toothed steel blades. The hacksaw blade 14 is provided at a bottom of the multi-functional saw, and the handsaw blade 24 is provided at a top of the multi-functional saw. Generally, the hacksaw blade 14 is in a shape of a narrow strip, and is more suitable for cutting curved objects, such as tubes; the handsaw blade 24 has a width larger than that of the hacksaw blade 14, and is more suitable for cutting flat objects, such as plates.

The saw bow 16 is connected between a top of the handsaw handle 22 and a top of the hacksaw handle 12, and is configured as a hollow tube for accommodating the handsaw blade 24 therein. A cross section of the saw bow 16 may be designed according to that of the handsaw blade 24, and in this embodiment is generally in a shape of a rectangular ring. One end of the saw bow 16 may be fixedly connected to the hacksaw handle 12, such as by riveting and the like; or, may be detachably connected to the hacksaw handle 12, such as by screwing and the like. Another end of the saw bow 16 away from the hacksaw handle 12 acts as a connecting end 18, and is detachably connected to the handsaw handle 22 by a connecting unit 30.

Figure 3:
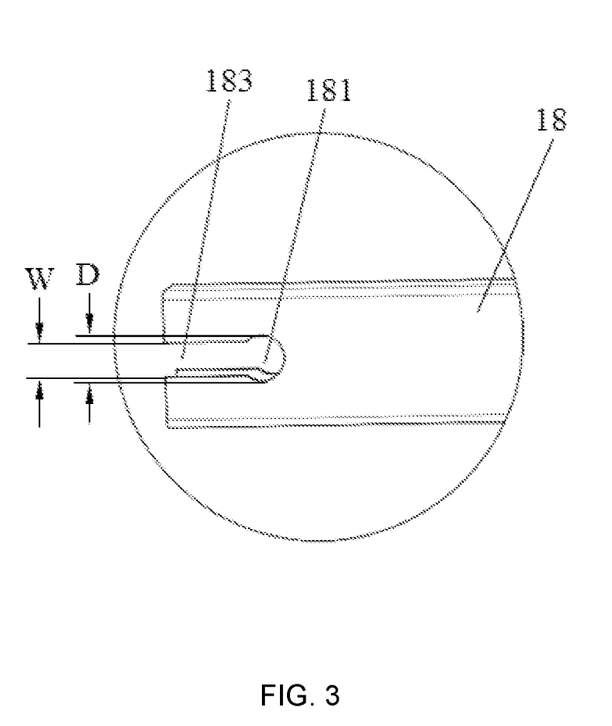
FIG. 3 is an enlarged view of circle A of FIG. 2

Specifically, as shown in FIG. 3, the connecting end 18 of the saw bow 16 defines a connecting hole 181 and a sliding groove 183 therein. The connecting hole 181 extends through the connecting end 18 along a thickness direction thereof. The sliding groove 183 extends along a longitudinal direction of the saw bow 16, one end of the sliding groove 183 communicates with the connecting hole 181, and another end of the sliding groove 183 extends through an end face of the connecting end 18. A width W of the sliding groove 183 is less than a diameter D of the connecting hole 181.

Figure 4:
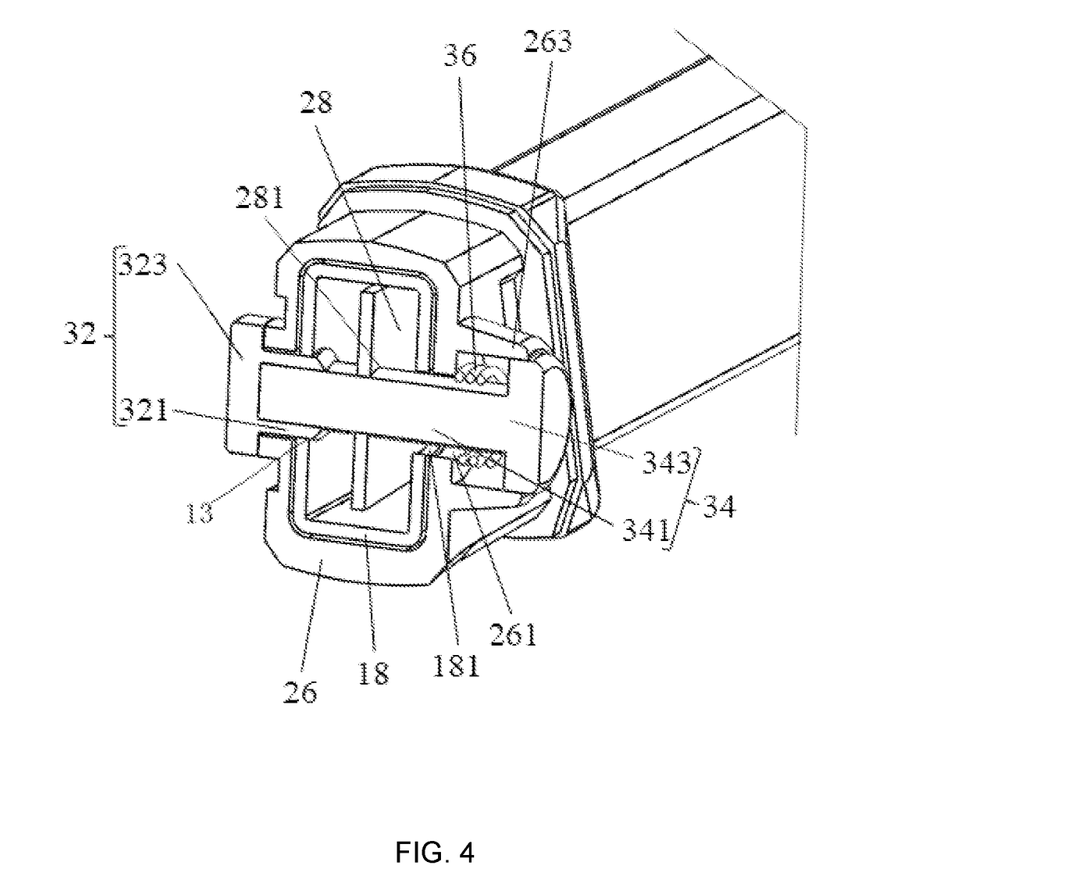
FIG. 4 is a cross sectional view of the multi-functional saw of FIG. 1.

Referring to FIG. 2 and FIG. 4, the handsaw handle 22 has a connecting portion 26 extending from its top towards the hacksaw handle 12. A mounting hole 261 is defined in and extends through the connecting portion 26 along its thickness direction. The mounting hole 261 corresponds to the connecting hole 181, and has a diameter substantially the same as that of the connecting hole 181. The connecting portion 26 has a cross section shape similar to that of the saw bow 16, and has a cross section size larger than that of the saw bow 16, thereby the connecting end 18 of the saw bow 16 can be inserted into the connecting portion 26 or drawn out from the connecting portion 26.

Referring to FIG. 4, the connecting unit 30 includes a first connecting member 32 and a second connecting member 34. The first connecting member 32 includes a first body 321 and a first head 323 provided at an end of the first body 321. The second connecting member 34 includes a second body 341 and a second head 343 provided at an end of the second body 341. The first body 321 and the second body 341 both are generally column-shaped, and the first head 323 and the second head 343 both are generally disc-shaped. A diameter of the first head 323 is larger than that of the first body 321, and a diameter of the second head 343 is larger than that of the second body 341.

During assembly, the connecting end 18 of the saw bow 16 in inserted into the connecting portion 26 of the handsaw handle 22 with the connecting hole 181 aligned with the mounting hole 261. The first body 321 of the first connecting member 32 and the second body 341 of the second connecting member 34 are inserted into the mounting hole 261 from two opposite sides of the connecting portion 26, respectively. The first body 321 extends at least partly into the connecting hole 181 of the connecting end 18, and a distal end of the second body 341 extends into the connecting hole 181 and engages into the first body 321 to fix the connecting end 18 to the connecting portion 26.

Preferably, the diameter of the first body 321 is equal to or slightly less than that of the mounting hole 261/connecting hole 181, and is larger than the width W of the sliding groove 183. That is, the first body 321 can not enter the sliding groove 183. The diameter of the second body 341 is less than that of the mounting hole 261/connecting hole 181, and is equal to or slightly less than the width W of the sliding groove 183. That is, the second body 341 can move from the connecting hole 181 to the sliding groove 183. The first head 323 and the second head 343 both are larger than the mounting hole 261 in diameter, and thus can not enter the connecting portion 26 via the mounting hole 261.

After assembled, the first head 323 abuts a corresponding side face of the connecting portion 26, and the second head 343 is spaced from a corresponding side face of the connecting portion 26. The first body 321 is engaged in the mounting hole 261/connecting hole 181, and is slidably connected to the connecting portion 26 and the connecting end 18. The second body 341 is in clearance fit with the connecting portion 26 and the connecting end 18. Engagement of the first body 321 in the connecting hole 181 of the connecting end 18 makes the connecting end 18 be fixed to the connecting portion 26. In this situation, the saw bow 16 can not be removed from the handsaw handle 22, and accordingly the handsaw assembly 20 is connected to the hacksaw assembly 10.

The second head 343 of the second connecting member 34 can be pressed to move towards the connecting portion 26 of the handsaw handle 22 for the space defined therebetwee, which causes moving of the first connecting member 32 along with the second connecting member 34 for the engagement between the first body 321 and the second body 341 until the first body 321 exists from the connecting hole 181 of the connecting end 18. In this situation, engagement between the first body 321 and the connecting end 18 of the saw bow 16 is released.

When the engagement between the first body 321 and the connecting end 18 is released, the saw bow 16 can be detached from the connecting portion 26 of the handsaw handle 22, and accordingly the handsaw assembly 20 can be detached from the hacksaw assembly 10. During detachment of the saw bow 16 from the handsaw handle 22, the second body 341 of the second connecting member 34 slides from the connecting hole 181 into the sliding groove 183 and then slides along the sliding groove 183 until it exits the connecting end 18 of the saw bow 16.

Preferably, the connecting unit 30 further includes an elastic member 36, such as a coil spring. The elastic member 36 is mounted around the second body 341 of the second connecting member 34, and sandwiched between the second head 343 of the second connecting member 34 and the corresponding side face of the connecting portion 26 to urge the second head 343 away from the connecting portion 26, thereby making the first head 323 of the first connecting member 32 to maintain its position abutting the connecting portion 26 and the first body 321 of the first connecting member 32 to maintain its position engaging into the connecting end 18.

When an external force is applied on the second head 343 of the second connecting member 34 to press it towards the connecting portion 26, movement of the second head 343 pushes the first body 321 of the first connecting member 32 to exit from the connecting end 18, and meanwhile pushes the elastic member 36 to generate deformation. When the external force applied on the second head 343 is withdrawn, the deformed elastic member 36 restores deformation and pushes the second head 343 to reset. Correspondingly, the first body 321 moves along with the second head 343 to reset, entering the connecting hole 181 of the connecting end 18.

Preferably, an annular sleeve 263 is provided on the side face of the connecting portion 26, which surrounds the elastic member 36 and the second head 343 of the second connecting member 34. The sleeve 263 acts as a guiding element to guide axial movement of the second head 343, ensuring that the first body 321 moves axially to enter or exit from the connecting hole 181 of the connecting end 18.

In this embodiment, the first connecting member 32, particularly the first body 321 is a nut, and the second connecting member 34, particularly the second body 341 is a bolt matching with the nut. An inner circumferential face of the nut is provided with inner threads, and an outer circumferential face of the bolt is provided with outer threads. After assembled, the bolt is screwed into the nut. In other embodiments, the first body 321 and the second body 341 may be connected together in other ways, such as snap-fitting, interference fitting and etc.

An end of the handsaw blade 24 is inserted into the connecting portion 26 of the handsaw handle 22 and detachably connected to the connecting portion 26 by the connecting unit 30, and another end of the handsaw blade 24 extends out of the connecting portion 26 towards the hacksaw handle 12. Specifically, two connecting pieces 28 are provided at two opposite sides of the end of the handsaw blade 24, respectively. A fixing hole 281 is defined in each of the connecting pieces 28 for extending of the second body 341 of the second connecting member 34 therethrough. In this embodiment, the fixing hole 281 is a threaded hole, and the second body 341 is screwed in the fixing hole 281 to connect the handsaw blade 24 to the connecting portion 26 of the handsaw handle 22.

During assembly of the hacksaw assembly 10 and the handsaw assembly 20, firstly, the connecting end 18 of the saw bow 16 is inserted into the connecting portion 26 and meanwhile the handsaw blade 24 is inserted into the saw bow 16, with the connecting hole 181, the mounting hole 261 and the fixing hole 281 are aligned with each other. Then, the connecting unit 30 is used to connect the saw bow 16, handsaw blade 24 and the connecting portion 26 together. Specifically, the first body 321 of the first connecting member 32 extends through the mounting hole 261 into the connecting hole 181 from one side of the connecting portion 26, and the second body 341 of the second connecting member 34 extends through the mounting hole 261, the connecting hole 181 and the fixing hole 281 in turn from another side of the connecting portion 26 to connect the first body 321.

Alternatively, the connecting unit 30 may be assembled to the connecting portion 26 of the handsaw handle 22 before assembly of the saw bow 16 to the connecting portion 26. In this situation, the second head 343 of the second connecting member 34 needs to be pressed towards the connecting portion 26 during inserting of the saw bow 16 into the connecting portion 26 until the second body 341 slides into the connecting hole 181 along the sliding groove 183, so that the first main portion 321 moves along with the second connecting member 34 to avoid the connecting end 18 of the saw bow 16 during assembly of the saw bow 16. After the second body 341 sliding into the connecting hole 181, the second head 343 is released and thus the elastic member 36 pushes the second head 343 to reset. The first connecting member 32 moves along with the second head 343 until its second body 341 enters the connecting hole 181 of the connecting end 18.

When the hacksaw assembly 10 and the handsaw assembly 20 are assembled together by the connecting unit 30, the saw bow 16 is connected between the connecting portion 26 of the handsaw handle 22 and the top of the hacksaw handle 12, and the handsaw blade 24 is accommodated inside the saw bow 16 and does not work. The hacksaw blade 14 is connected between bottoms of the hacksaw handle 12 and the handsaw handle 22. The hacksaw assembly 10 and the handsaw assembly 20 cooperatively construct a hacksaw to cut corresponding objects to be processed, such as tubes.

When the handsaw assembly 20 needs to be detached from the hacksaw assembly 10, the second head 343 of the second connecting member 34 is pressed towards the connecting portion 26 and thus the elastic member 36 is compressed, the first body 321 exits from the connecting end 18 to disengage the first connecting member 32 from the saw bow 16, and thus the saw bow 16 can be drawn out from the connecting portion 26 of the handsaw handle 22. Accordingly, the handsaw blade 24 is taken out from the saw bow 16. In addition, the hacksaw blade 14 is detached from the bottom of the handsaw handle 22 during disassembly of the handsaw assembly 20 from the hacksaw assembly 10.

When the hacksaw assembly 10 and the handsaw assembly 20 are disassembled, the hacksaw blade 14 and the saw bow 16 are disconnected from the handsaw handle 22, and the handsaw blade 14 is taken out from the saw bow 16. In this situation, the handsaw assembly 20 (including the handsaw handle 22 and the handsaw blade 24 connected to the handsaw handle 22) can be used alone as a handsaw to cut a corresponding object to be processed, such as a plate.

As shown in FIG. 2, a first connecting part 19 is provided at the bottom of the hacksaw handle 12, and a second connecting part 29 is provided at the bottom of the handsaw handle 22. Two ends of the hacksaw blade 14 are detachably connected to the first connecting part 19 and the second connecting part 29, respectively, so as to facilitate the replacement and maintenance of the hacksaw blade 14, and facilitate assembly and disassembly of the hacksaw assembly 10 and the handsaw assembly 20. The specific connection manner of the hacksaw blade 14 to the hacksaw handle 12 and handsaw handle 22 may refer to that in the prior art, which will not be described here.

For the present multi-functional saw, which includes a hacksaw assembly 10 and a handsaw assembly 20 being detachably connected with each other, the hacksaw assembly 10 and the handsaw assembly 20 may be connected to each other to construct a hacksaw, or the handsaw assembly 20 may be alone construct a handsaw after being detached from hacksaw assembly 10. That is, the present multi-functional saw can be used as two different types of saws, and has an advantage of one object with multifunction. The user can choose a corresponding usage mode according to the object to be cut, thereby meeting the demands of complex applications.

Figure 8:
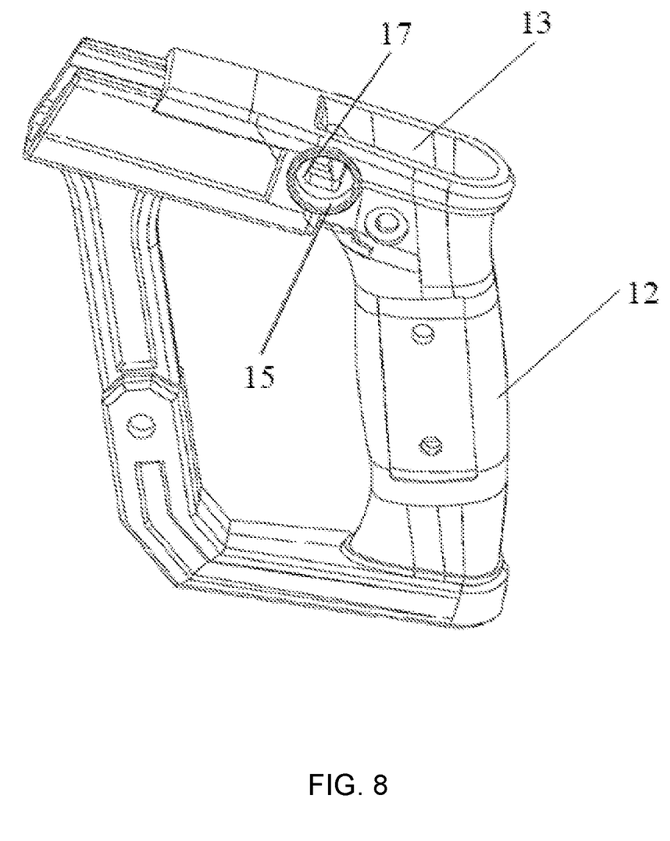
FIG. 8 is a schematic view of a hacksaw handle of the multi-functional saw of FIG. 1.

Preferably, a tensioning unit 40 is provided on the hacksaw handle 12 and connected to the hacksaw blade 14 for tension the hacksaw blade 14. As shown in FIG. 8, the hacksaw handle 12 defines a chamber 13 for accommodating the tensioning unit 40.

Figure 5:
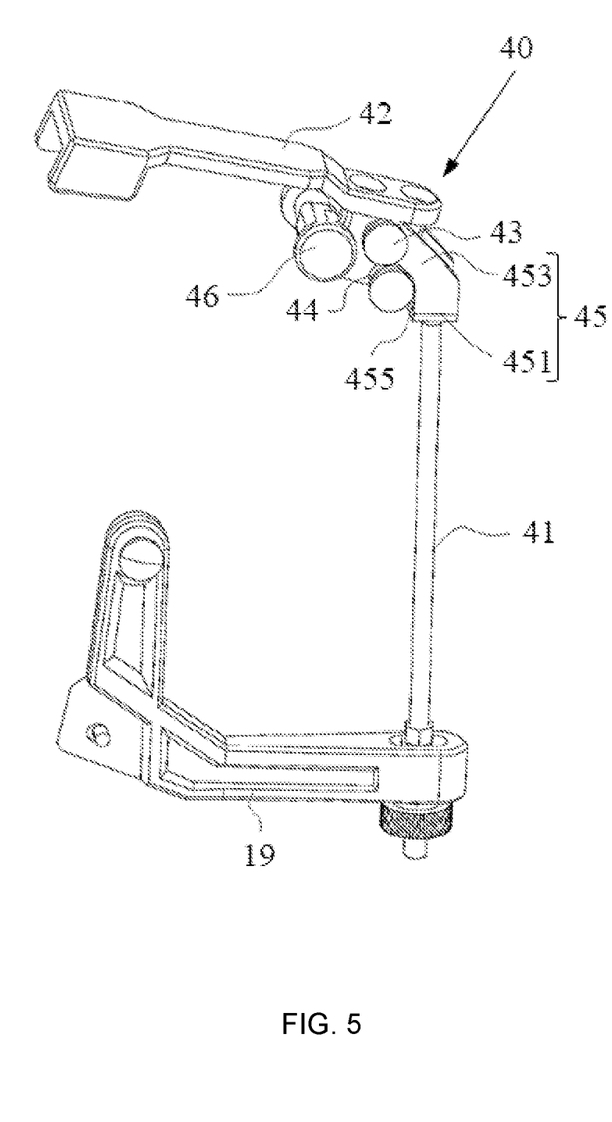
FIG. 5 is a schematic view of a tensioning unit of the multi-functional saw of FIG. 1.

As shown in the FIG. 5, the tensioning unit 40 includes a tensioning rod 41 and a tensioning handle 42. The tensioning handle 42 is provided with a clamping wheel 43 and a clamping shaft 44. The tensioning handle 42 is hinged with the hacksaw handle 12 by the clamping shaft 44. The tensioning rod 41 is elongated and extends generally along a longitudinal direction. A first end (such as a top end) of the tensioning rod 41 is hinged with the clamping wheel 43 through a connecting component 45, and a second end (such as a bottom end) of the tensioning rod 41 is hinged with the hacksaw blade 14 through the second connecting part 19 provided at the bottom of the hacksaw handle 12.

Figure 6:
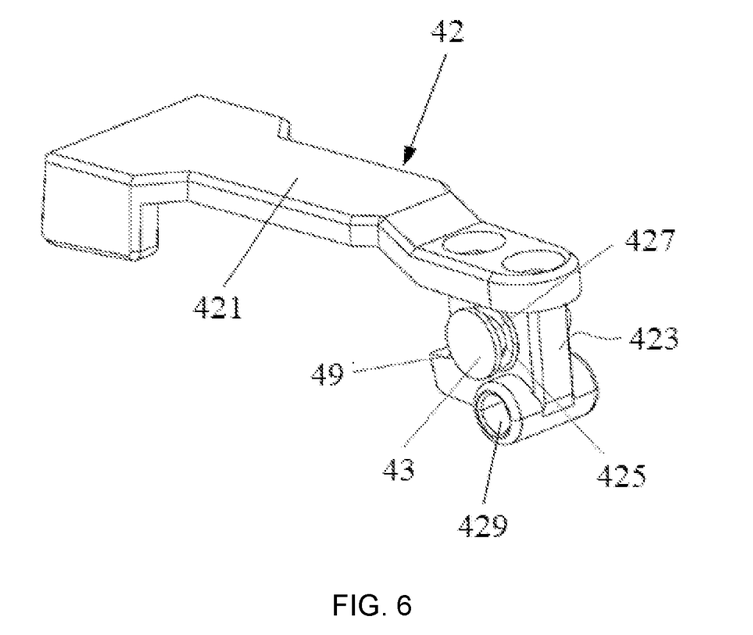
FIG. 6 is a schematic view of a tensioning handle of the tensioning unit of FIG. 5.

Referring to FIG. 6, the tensioning handle 42 includes a handle body 421 and a connecting block 423 formed at a bottom of one end (such as a rear end) of the handle body 421. Preferably, the connecting block 423 and the handle body 421 are integrally formed as one piece. The handle body 421 is arranged on the top of the hacksaw handle 12, thereby facilitating users to press. The clamping wheel 43 and the clamping shaft 44 are provided on the connecting block 423, and an outer circumferential face of the clamping wheel 43 is tangent to an outer circumferential face of the clamping shaft 44.

In this embodiment, a first through hole 425 is defined in the connecting block 423 for mounting a pivot 427, and a second through hole 429 is defined in the connecting block 423 for mounting the clamping shaft 44. An axial direction of the pivot 427 is parallel to that of the clamping shaft 44, and both are perpendicular to that of the tensioning rod 41. Two ends of the pivot 427 extend beyond the connecting block 423, and each are provided with one clamping wheel 43. The clamping wheels 43 may be integrally formed with the pivot 427, the pivot 427 may be integrally formed with the connecting block 423, and the clamping shaft 44 may be integrally formed with the connecting block 423.

In this embodiment, the connecting component 45 is generally U-shaped, and includes a bottom plate 451 and two arms 453 extending obliquely from opposite sides of the bottom plate 451, respectively. The top end of the tensioning rod 41 is connected to a middle of the bottom plate 451, and a top end of each arm 453 is hinged with one end of the pivot 427. In this embodiment, the top end of each arm 453 is sandwiched between the connecting block 423 and one corresponding clamping wheel 43. Preferably, and a side face 455 of the arm 453 facing towards the clamping shaft 44 is curved.

Figure 7:
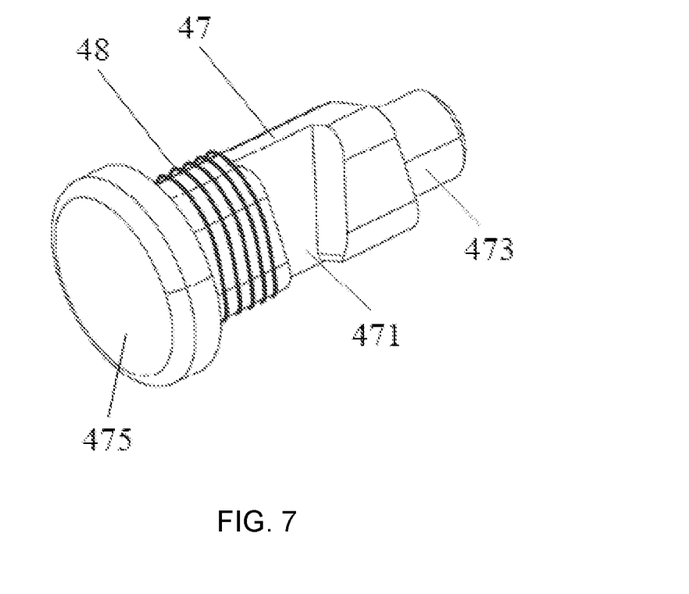
FIG. 7 is a schematic view of a locking shaft and an elastic component of the tensioning unit of FIG. 5.

In this embodiment, the tensioning unit 40 further includes a locking mechanism 46. Referring to FIG. 6 and FIG. 7, the locking mechanism 46 includes a locking shaft 47, an elastic component 48 mounted around the locking shaft 47 and a latching member 49.

As shown in FIG. 8, the hacksaw handle 12 defines a shaft hole 15 for mounting the locking shaft 47, preferably the locking shaft 47 is slidably mounted in the shaft hole 15. An axial direction of the locking shaft 47 is parallel to that of the clamping shaft 44 and perpendicular to that of the tensioning rod 41. As shown in FIG. 7, a wedge-shaped groove 471 is defined in a middle of the locking shaft 47 with a width decreasing gradually and downwardly. As shown in FIG. 6, the latching member 49 is provided at a front side of the connecting block 423 of the tensioning handle 42, preferably in the form of a hook for cooperating with the wedge-shaped groove 471 of the locking shaft 47.

One end 473 of the locking shaft 47 extends beyond the shaft hole 15 and is threadly connected to a fixing element, such as a nut. In this embodiment, the nut has an outer diameter greater than the diameter of the shaft hole 15, and is pressed against a side face of the hacksaw handle 12 around the shaft hole 15. Another end of the locking shaft 47 extends beyond the shaft hole 15 and is provided with a first abutting portion 475, and an outer diameter of the first abutting portion 475 is greater than the diameter of the shaft hole 15. A second abutting portion 17 is provided on an inner wall of the shaft hole 15, and the elastic component 48 is mounted around the locking shaft 47 with one end abutting the first abutting portion 475 and another end extending into the shaft hole 15 and abutting the second abutting portion 17.

In normal state, the tensioning unit 40 is unlocked, and the hacksaw blade 14 is not tightened.

When the hacksaw blade 14 is intended to use, firstly the hacksaw blade 14 needs to be tightened. Specifically, an end (such as a front end) of the handle body 421 of the tensioning handle 42 away from the clamping shaft 44 is pressed downwardly to make the tensioning handle 42 rotate along the outer circumferential face of the clamping shaft 44 with the clamping shaft 44 as the center. The latching member 49 moves downwardly relative to the locking shaft 47 under the guiding of the wedge-shaped groove 471 and thus makes the locking shaft 47 moves relative to the tensioning handle 42 along an axial direction of the shaft hole 15, accordingly the elastic component 48 is compressed and deformed.

When the latching member 49 reaches a bottom of the wedge-shaped groove 471 and exits from the wedge-shaped groove 471, the locking shaft 47 resets under the action of the deformed elastic component 48, and the latching member 49 is clamped to the bottom of the locking shaft 47 at a portion deviating from the wedge-shaped groove 471, thereby the tensioning handle 42 is locked. During the locking process, rotation of the tensioning handle 42 with the clamping shaft 44 as the center makes the tensioning rod 41 move upwardly through the connecting component 45, and in turn makes the hacksaw blade 14 be tightened.

After using the hacksaw blade 14, the first abutting portion 475 of the locking shaft 47 may be pressed to move towards the connecting block 423, making the wedge-shaped groove 471 be aligned with the latching member 49 and compress the elastic component 48. In this situation, a pulling force of the tensioning rod 41 makes the latching member 49 move upwardly relative the locking shaft 47, the latching member 49 enters the wedge-shaped groove 471 and then moves along the wedge-shaped groove 471 to reset, the deformed elastic component 48 pushes the locking shaft 47 to reset. Thereby, the tensioning handle 42 is unlocked, and a tensioning force of the locked tensioning handle 42 to the hacksaw blade 14 is gone.

In this embodiment, the tensioning handle 42 of the tensioning unit 40 is pressed to lock with the latching member 49 of the locking mechanism 46 before the clamping wheel 43 rotates to a dead point, wherein the dead point is generally a tangent point between the clamping wheel 43 and the clamping shaft 44 when the central axes of the clamping wheel 43 and the clamping shaft 44 are horizontal.

Figure 9:
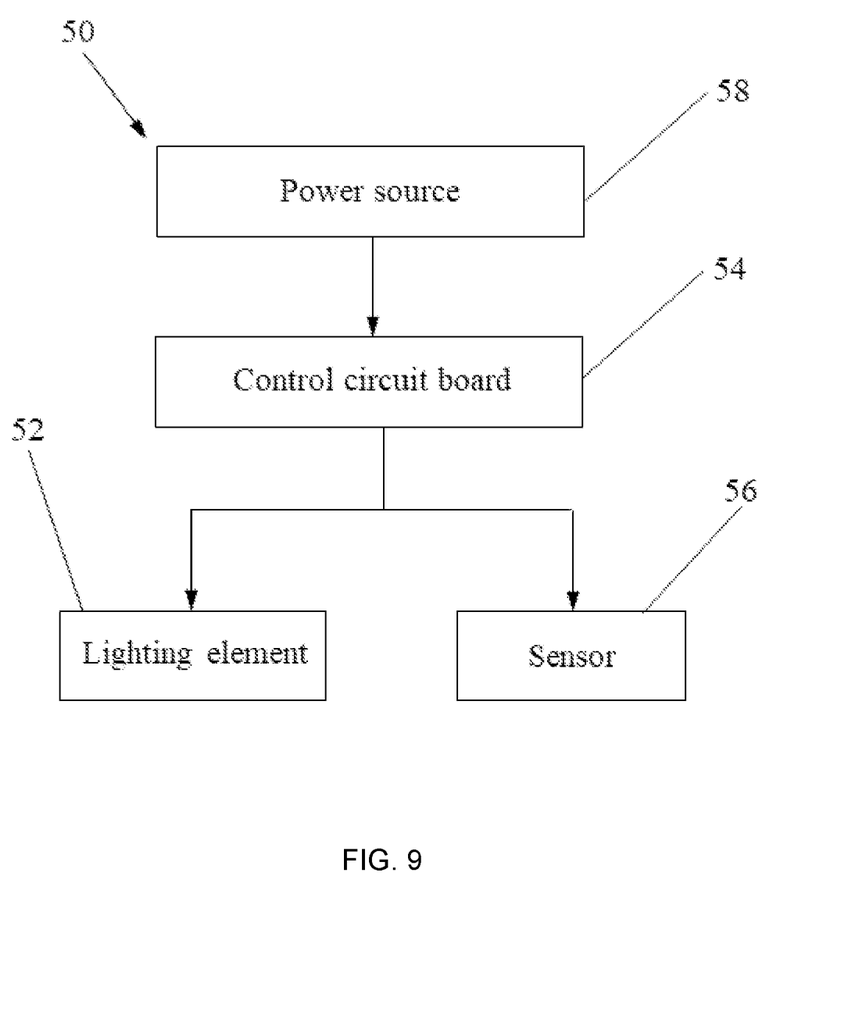
FIG. 9 is a circuit block diagram of a lighting unit of the multi-functional saw of FIG. 1.

Further, the multi-functional saw may include a lighting unit 50. As shown in FIG. 9, the lighting unit 50 includes a lighting element 52, a control circuit board 54 connected to the lighting element 52 electrically, a sensor 56 and a power source 58 supplying electric power to the lighting element 52 through the control circuit board 54. The lighting element 52 may be LEDs, and is mounted at a bottom of the saw bow 16 or at an inner side of the hacksaw handle 12. The sensor 56 detects a brightness of the environment and generates a corresponding signal to the control circuit board 54, and the control circuit board 54 controls the light source 52 on or off according to the signal of the sensor 56, making it convenient for users to use.

It should be noted that the above merely describes preferred embodiments of the present invention without intention to limit the scope of the present invention. Although the present invention has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present invention should be within the scope of the present invention.

What is claimed is:

1. A multi-functional saw comprising a hacksaw assembly and a handsaw assembly,
   the hacksaw assembly comprising a hacksaw handle, a hacksaw blade and a saw bow;
   the handsaw assembly comprising a handsaw handle and a handsaw blade, a connecting portion being provided at a top of the handsaw handle, the handsaw blade being connected to the connecting portion by a connecting unit;
   one end of the saw bow being connected to a top of the hacksaw handle, and another end of the saw bow being detachably connected to the connecting portion of the handsaw handle by the connecting unit, the handsaw blade being accommodated in the saw bow when the saw bow connected to the connecting portion; and
   one end of the hacksaw blade being connected to a bottom of the hacksaw handle, and another end of the hacksaw blade being detachably connected to a bottom of the handsaw handle,
   wherein the another end of the saw bow is inserted into the connecting portion of the handsaw handle, a connecting hole is defined in the another end of the saw bow, and a mounting hole is defined in the connecting portion corresponding to the connecting hole;
   the connecting unit comprises a first body and a second body, a diameter of the second body is less than a diameter of the first body;
   the first body extends through the mounting hole into the connecting hole to connect the saw bow to the connecting portion, and the first body exits from the connecting hole to disconnect the saw bow from the connecting portion.

2. The multi-functional saw according to claim 1, wherein the another end of the saw bow defines a sliding groove with a width less than a diameter of the connecting hole, one end of the sliding groove communicating with the connecting hole, and another end of the sliding groove extends through an end face of the another end of the saw bow;
   the diameter of the first body is larger than the width of the sliding groove and not larger than the diameter of the connecting hole, and the diameter of the second body is not larger than the width of the sliding groove;
   when the first body exits from the connecting hole, the second body slides along the sliding groove to exit from the another end of the saw bow to disconnect the saw bow from the connecting portion.

3. The multi-functional saw according to claim 2, wherein a first head is provided at an end of the first body with a diameter larger than that of the mounting hole, and a second head is provided at an end of the second body with a diameter larger than that of the mounting hole;
   when the first body extends into the connecting hole, the first head abuts the connecting portion, and the second head is spaced from the connecting portion; and
   the second head moves towards the connecting portion to make the first body exits from the connecting hole.

4. The wire multi-functional saw according to claim 3, wherein an elastic member is mounted around the second body and sandwiched between the second head and the connecting portion.

5. The multi-functional saw according to claim 4, wherein a sleeve is provided on the connecting portion and surrounds the elastic member and the second head.

6. The multi-functional saw according to claim 3,
   wherein the first body and the second body are inserted into the connecting hole from two opposite sides of the connecting portion, respectively, and a distal end of the second body is engaged into the first body.

7. The multi-functional saw according to claim 6, wherein the first body is a nut, and the second body is a bolt and screwed into the nut.

8. The multi-functional saw according to claim 7, wherein one end of the handsaw blade is inserted into the connecting portion and screwed to the second body, and another end of the handsaw blade extends out of the connecting portion.

9. The multi-functional saw according to claim 8, wherein two connecting pieces are provided at two opposite sides of the one end of the handsaw blade, respectively; and fixing holes are defined in the two connecting pieces for extending of the second body therethrough.

10. The multi-functional saw according to claim 1, wherein the hacksaw handle is configured as a closed handle structure, and the handsaw handle is configured as a pistol grip saw frame structure.

11. The multi-functional saw according to claim 1, wherein a tensioning unit is provided in the hacksaw handle and connected to the hacksaw blade for tension of the hacksaw blade.

12. The multi-functional saw according to claim 11, wherein
   the tensioning unit comprises a tensioning rod and a tensioning handle, the tensioning handle is provided with a clamping wheel and a clamping shaft;
   the tensioning handle is hinged with the hacksaw handle by the clamping shaft, one end of the tensioning rod is hinged with the clamping wheel, and another end of the tensioning rod is connected to the hacksaw blade;
   rotation of the tensioning handle about the clamping shaft causes moving of the tensioning rod along its axial direction.

13. The multi-functional saw according to claim 12, wherein an outer circumferential face of the clamping wheel is tangent to an outer circumferential face of the clamping shaft.

14. The multi-functional saw according to claim 12, wherein the tensioning unit further comprises a locking shaft and a latching member, the locking shaft is arranged perpendicular to the tensioning rod and defines a sliding slot wedge-shaped groove therein, a width of the sliding slot in an axial direction of the locking shaft decreases gradually along a longitudinal direction;

rotation of the tensioning handle about the clamping shaft causes sliding of the latching member along the sliding groove to lock the tensioning handle.

15. The multi-functional saw according to claim 14, wherein the hacksaw handle defines a shaft hole therein, and the locking shaft is slidably mounted in the through shaft hole;

sliding of the latching member along the sliding groove wedge-shaped groove causes moving of the locking shaft along its axial direction.

16. The multi-functional saw according to claim 14, wherein the latching member is a hook and is provided on the tensioning handle.

17. The multi-functional saw according to claim 14, wherein the tensioning unit further comprises an elastic component arranged between the locking shaft and the hacksaw handle.

18. The multi-functional saw according to claim 1, wherein a lighting element is provided on the saw bow or the hacksaw handle.

19. The multi-functional saw according to claim 18, further comprising a control circuit board and a sensor, the sensor is configured for detecting a brightness of an environment, and the control circuit board controls the lighting element on or off according to a signal of the sensor.

* * * * *